(12) United States Patent
Willig et al.

(10) Patent No.: US 10,637,891 B2
(45) Date of Patent: Apr. 28, 2020

(54) METHODS AND DEVICES FOR MEDIA DESCRIPTION DELIVERY

(75) Inventors: Johannes Willig, Herzogenrath (DE); Daniel Catrein, Würselen (DE); Frank Hartung, Herzogenrath (DE); Markus Kampmann, Aachen (DE); Frederic Gabin, Bagnolet (FR)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 472 days.

(21) Appl. No.: 13/282,136

(22) Filed: Oct. 26, 2011

(65) Prior Publication Data

US 2012/0110120 A1    May 3, 2012

Related U.S. Application Data

(60) Provisional application No. 61/409,285, filed on Nov. 2, 2010.

(51) Int. Cl.
*G06F 15/16* (2006.01)
*H04L 29/06* (2006.01)

(52) U.S. Cl.
CPC ........ *H04L 65/1016* (2013.01); *H04L 65/104* (2013.01); *H04L 65/105* (2013.01); *H04L 65/4084* (2013.01)

(58) Field of Classification Search
CPC ... H04L 65/602; H04L 65/80; H04L 65/1016; H04L 65/4084; H04L 65/105;
(Continued)

(56) References Cited

U.S. PATENT DOCUMENTS

2002/0087717 A1* 7/2002 Artzi .................. G06F 9/445
                                                    709/236
2002/0143974 A1* 10/2002 Swix et al. ............... 709/231
(Continued)

FOREIGN PATENT DOCUMENTS

CN          1622502 A       6/2005
CN         101106538 A      1/2008
(Continued)

OTHER PUBLICATIONS

Third Generation Partnership Project. "Technical Specification Group Services and System Aspects; IP Multimedia Subsystem (IMS) based packet Switch Streaming (PSS) and Multimedia Broadcast/Multicast Service (MBMS) User Service; Protocols (Release 10)." Sep. 2010; pp. 1-99; 3GPP TS 26.237 V10.0.0; Sophia Antipolis, Valbonne, France.

(Continued)

*Primary Examiner* — Tonia L Dollinger
*Assistant Examiner* — Mehulkumar J Shah
(74) *Attorney, Agent, or Firm* — Coats & Bennett, PLLC

(57) ABSTRACT

Methods and devices for providing a media description of a media stream to a client are described. The client is subscribed to a media description delivery service. The media description delivery service comprises a media description delivery rule. A request for a media description delivery is sent to a media server. From the media server a media description is received. It is verified that the received media description complies with the media description delivery rule and if the verification is in the affirmative, a delivery of the media description is initiated to the client.

23 Claims, 10 Drawing Sheets

(58) Field of Classification Search
CPC ... H04L 65/104; H04L 63/16; H04L 65/1069; H04L 65/1006; H04L 65/60; H04L 29/06; H04N 21/2408; H04N 21/2743; H04N 21/41407; H04N 21/4227; H04N 21/4223; H04N 21/437; H04N 21/4788; H04N 21/6181; H04N 21/43637; G06F 15/16; G06F 17/30017; G06Q 30/06
USPC .............. 709/217; 340/1.1; 375/219; 711/1
See application file for complete search history.

(56) References Cited

U.S. PATENT DOCUMENTS

| | | | |
|---|---|---|---|
| 2003/0110503 A1* | 6/2003 | Perkes | 725/86 |
| 2006/0165060 A1* | 7/2006 | Dua | 370/352 |
| 2006/0265427 A1* | 11/2006 | Cohen | G06Q 99/00 |
| 2007/0124785 A1* | 5/2007 | Marsico | 725/105 |
| 2007/0165620 A1 | 7/2007 | Li et al. | |
| 2008/0010688 A1* | 1/2008 | Cai | H04L 63/20 726/28 |
| 2008/0120129 A1* | 5/2008 | Seubert et al. | 705/1 |
| 2008/0201451 A1 | 8/2008 | Yu et al. | |
| 2008/0212749 A1* | 9/2008 | Huang | H04M 3/42017 379/88.25 |
| 2008/0307108 A1* | 12/2008 | Yan | H04L 65/1016 709/231 |
| 2009/0037093 A1* | 2/2009 | Kurihara | G01C 21/26 701/533 |
| 2009/0100147 A1 | 4/2009 | Igarashi | |
| 2009/0124196 A1 | 5/2009 | Moon et al. | |
| 2009/0307757 A1 | 12/2009 | Groten | |
| 2010/0009704 A1* | 1/2010 | Fan | H04L 65/1006 455/466 |
| 2010/0030873 A1* | 2/2010 | Schwesig | G11B 27/031 709/219 |
| 2010/0094952 A1* | 4/2010 | Lindgren | G06Q 10/06 709/219 |
| 2010/0121963 A1* | 5/2010 | Peng | H04N 21/643 709/228 |
| 2010/0216500 A1* | 8/2010 | Shatsky | 455/518 |
| 2011/0082825 A1* | 4/2011 | Sathish | G06Q 30/08 706/46 |
| 2011/0082946 A1* | 4/2011 | Gopalakrishnan | H04L 65/4084 709/231 |
| 2011/0096828 A1* | 4/2011 | Chen | H04N 21/23106 375/240.02 |
| 2011/0119394 A1* | 5/2011 | Wang | H04N 21/23439 709/231 |
| 2011/0125919 A1* | 5/2011 | Kwon | H04N 21/23439 709/231 |
| 2011/0196973 A1* | 8/2011 | Shaheen et al. | 709/228 |
| 2011/0231569 A1* | 9/2011 | Luby | H04L 65/607 709/234 |
| 2011/0235507 A1* | 9/2011 | You | H04W 12/08 370/230 |
| 2011/0246563 A1* | 10/2011 | Keum | H04N 7/17318 709/203 |
| 2011/0307581 A1* | 12/2011 | Furbeck | H04L 65/1083 709/219 |
| 2012/0017282 A1* | 1/2012 | Kang | G06F 21/10 726/26 |
| 2012/0087634 A1* | 4/2012 | Lalwaney | H04L 65/4084 386/241 |
| 2012/0259950 A1* | 10/2012 | Havekes et al. | 709/217 |
| 2013/0042013 A1* | 2/2013 | Bouazizi | 709/228 |

FOREIGN PATENT DOCUMENTS

| | | |
|---|---|---|
| EP | 1838102 A1 | 9/2007 |
| EP | 1909411 A1 | 4/2008 |
| JP | 2008098887 A | 4/2008 |
| JP | 2008526145 A | 7/2008 |
| JP | 2008204451 A | 9/2008 |
| WO | 2007010983 A1 | 1/2007 |
| WO | 2007102547 A1 | 9/2007 |

OTHER PUBLICATIONS

Third Generation Partnership Project. "Technical Specification Group Services and System Aspects; IP Multimedia Subsystem (IMS) based packet Switch Streaming (PSS) and Multimedia Broadcast/Multicast Service (MBMS) User Service; Protocols (Release 9)." Sep. 2010; pp. 1-99; 3GPP TS 26.237 V9.4.0; Sophia Antipolis, Valbonne, France.

Pantos, R., et al., "HTTP Live Streaming draft-pantos-http-live-streaming-04", Apple IETF draft, Jun. 5, 2010, http://tools.ietf.org/html/draft-pantos-http-live-streaming-04.

Open IPTV Forum, "Release 2 Specification, HTTP Adaptive Streaming", Sep. 6, 2010, Draft V2.0.

3rd Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)", 3GPP TS 26.237 V9.3.0, Jun. 2010, pp. 1-99.

3rd Generation Partnership Project, "Technical Specification Group Services and System Aspects; Transparent end-to-end Packet-switched Streaming Service (PSS); Protocols and codecs (Release 9)", 3GPP TS 26.234 V9.4.0, Sep. 2010, pp. 1-187.

Telefon AB LM Ericsson, et al., "IMS based Adaptive HTTP Streaming", 3GPP TSG-SA4#61, Tdoc S4-100783, pp. 1-8, Nov. 8-12, 2010, Barcelona, Spain.

* cited by examiner

METHODS AND DEVICES FOR MEDIA DESCRIPTION DELIVERY

RELATED APPLICATIONS

This application claims priority to U.S. Provisional Application Ser. No. 61/409,285, filed Nov. 2, 2010.

TECHNICAL FIELD

The present invention relates to methods for media description delivery. Devices and software programs embodying the invention are also described.

BACKGROUND

An important application of transmission networks like the Internet or mobile telephone networks is the media delivery from a server to a client. Media may be, for example, audio and video.

Media delivery in IP (Internet Protocol) based networks may use different transport protocols. Traditionally, either RTP (Real-time Transport Protocol) over UDP (User Datagram Protocol) is used for real-time streaming and packet-based streaming or HTTP (Hyper Text Transfer Protocol) over TCP (Transmission Control Protocol) for download of whole files, mostly for later consumption but also for life streaming. RTP allows for dynamic adaptation to available bit-rate as measured by the client. A drawback of RTP and the associated control protocol RTSP (Real-time Streaming Protocol) is the need for specialized and more complicated server software, while HTTP can use widely deployed and inexpensive HTTP server software. A recent development, Dynamic Adaptive HTTP Streaming (DASH), aims at combining the advantages of both approaches. DASH is standardized in 3GPP (Third Generation Partnership Project) Technical Specification (TS) 26.234 v 9.4.0 Transparent end-to-end Packet-switched Streaming Service (PSS), and also adopted and slightly extended in the Open IPTV Forum (OIPF) and MPEG (Moving Pictures Experts Group).

In DASH, the content (which is also denoted as media herein) is encoded in different versions, usually corresponding to different bit rates. If the content is for example a video with a video track and an audio track, the video track could be encoded in three versions with different bit rate each, and the audio track in a high-quality stereo and a mono version. Each version is further divided into segments of a few seconds duration. For example, the video versions can be divided into many consecutive segments of 10 seconds duration each. The segments may be formatted according to the MPEG-4 file format, or according to the MPEG-2 transport stream format.

The actual transmission of the video and audio tracks is performed by downloading one segment after the other initiated by the client. In this procedure the client downloads a segment using a standard HTTP request, unpacks, decodes, and renders it, and then performs the same for the next segment and so forth for further segments. The client has knowledge about the available quality versions, and about the segment separation over time by means of a media description, the so-called Media Presentation Description (MPD). The MPD format as defined in 3GPP TS 26.234, OIPF, and MPEG is an XML (eXtensible Markup Language) encoded file containing appropriate information and attributes to describe the media. The MPD is the first resource transmitted to a client in order to start a DASH based media delivery. In other words, the purpose of the MPD is to give location and timing information to the client to fetch and playback the media segments of a particular content.

The MPD consists of three major components, namely Periods, Representations and Segments. As depicted in FIG. 11, Period elements are the outermost part of the MPD. Periods are typically larger pieces of media that are played out sequentially. Inside a period, multiple different encodings of the content may occur. Each alternative of a period is called a Representation. These alternative Representations can have, for example, different bitrates, frame rates or video resolutions. Finally, each Representation describes a series of segments by media links, e.g. HTTP Uniform Resource Locators (URLs). Those URLs are either explicitly described in the Representation (similar to a playlist) or described through a template construction, which allows the client to derive a valid URL for each segment of a representation. Content play-list or advertisement-insertion functionality can easily be achieved by chaining periods of different content.

Each segment is downloaded at the maximum available speed under the present operation conditions of the network used for transmission and the client monitors the download speed it experiences. Based on the experienced download speed the client selects the most appropriate of the available quality versions. From segment to segment this may be a different version, and the client can download different qualities depending on the present operation conditions, hence the attribute "adaptive" HTTP streaming. FIG. 1 visualizes the principle and shows different media representations for adaptive HTTP streaming of a content item as a function of the playout time. The three representations in FIG. 1, i.e. "Representation 1", "Representation 2", and "Rep. 3", may correspond to a high, medium and low bitrate representation, respectively, of a content item, i.e. stream. Begin and end of the playout time for the stream segments (a segment may be abbreviated as "Seg.") of different representations coincide so that smooth switching between the representations is possible. The vertical scale in FIG. 1 illustrates the data size of the different stream representations, e.g. their bit rate. Depending on the client implementation, enhanced selection procedures are possible for switching between the representations, e.g. including a hysteresis in order to avoid excessive quality fluctuations when viewing or listening to a stream.

In the progress of the DASH session, the MPD may be updated at the HTTP server. Especially in the case of live streaming the MPD is usually updated on a regular basis, e.g., to add other content items such as advertisements to the media presentation. In particular, at least one of the Periods, Representations and Segments may be changed for updating an MPD. For example, an updated MPD may contain new/additional segments (to be rendered in the future), that were not included in the previous one, or remove old media segments that should have already been rendered by the clients. The update may also modify the number of available media qualities, e.g., media bitrates.

In order to get an updated MPD, the client must send a HTTP request to the HTTP server, to get the current MPD back by an HTTP response. In order to get properly informed on an MPD update, the UE may send frequent HTTP requests to the HTTP server, i.e., HTTP requests may be sent at a rate that is higher than an MPD update rate. In this case, the MPD is not updated on every HTTP request and the HTTP server responds with one or even more HTTP responses comprising the MPD that has been delivered already previously to the UE. Hence, unnecessary HTTP requests and responses are exchanged, which waste resources between the UE and HTTP server. This is especially harmful if the transmission path includes radio links of a mobile communication network.

On the other hand, if the UE sends HTTP requests for MPD updates infrequently, i.e., at a rate lower then the MPD update rate, the UE may lack the MPD update for a longer time, i.e. the time between MPD update and next HTTP response comprising the updated MPD. In the meantime, the UE can run out of media segments in its buffer and the media play-out is interrupted.

Another trend in multimedia communication is the usage of the IP Multimedia Subsystem (IMS) for the initiation and control of multimedia sessions. Within 3GPP, standardized solutions for IMS controlled RTP streaming as well as for IMS controlled HTTP progressive download are defined in 3GPP TS 26.237 V9.3.0 (2010-06) with the title IP Multimedia Subsystem (IMS) based Packet Switch Streaming (PSS) and Multimedia Broadcast/Multicast Service (MBMS) User Service; Protocols. These solutions benefit from the standardized features offered by IMS like charging, authentication or QoS (Quality of Service) reservation.

FIG. 2 shows the different signaling steps in case of IMS controlled HTTP progressive download as defined in defined in 3GPP TS 26.237. The session is initiated with a SIP (Session Initiation Protocol) INVITE message which includes SDP (Session Description Protocol) information. The HTTP URL (Uniform Resource Locator) for download is delivered to the user equipment (UE), i.e. client, via the SIP 200 OK message. In addition, a QoS reservation for the HTTP progressive download session may be carried out. The progressive download itself is initiated by the UE with a HTTP GET command towards the HTTP server, which in return responds with the requested content file. In more detail, the following steps are performed:

1. The UE initiates the progressive download session by sending SIP INVITE to the IM CN subsystem, including an SDP offer.
2. The IM CN subsystem forwards the SIP INVITE message to the SCF.
3. The SCF verifies the user rights for the requested content, selects an HTTP/SIP adapter, and forwards the SIP INVITE message to the HTTP/SIP adapter.
4. The HTTP/SIP adapter selects an HTTP Server, and sends an HTTP POST message to the HTTP server, including the IP address of the UE.
5. The HTTP server answers to the HTTP/SIP adapter with a HTTP 200 OK response.
6. The HTTP/SIP adapter sends the SIP 200 OK answer to the SCF, including download URL of the requested content file in the SDP answer.
7. The SCF forwards the SIP 200 OK to the IM CN subsystem.
8. The IM CN subsystem forwards the SIP 200 OK to the UE.
9. The UE sends an HTTP request to the URL obtained from the SIP 200 OK message.
10. The HTTP server delivers the content file in the HTTP response to the UE.

The IMS controlled HTTP progressive download according to 3GPP TS 26.237 v 9.3.0 applies to the delivery of content files, but does not apply to the delivery of media presentations such as MPDs.

SUMMARY

It is an object of the present invention to provide an improved method for providing a media description of a media stream to a client and corresponding devices, computer programs, and system.

According to a first aspect, a method for providing a media description of a media stream to a client is provided. The client is subscribed to a media description delivery service. The media description delivery service comprises a media description delivery rule. A request for a media description delivery is sent to a media server and from the media server a media description is received. It is verified that the received media description complies with the media description delivery rule. If the verification is in the affirmative, a delivery of the media description to the client is initiated.

According to an embodiment, the method may comprise the step of receiving a subscription request for the subscribing the client to the media delivery service.

According to a further embodiment, the subscription request may specify at least one of an address of the client, an indication for the media description delivery service (e.g. such as MPD-update event), and which media description is to be delivered.

According to a further embodiment, the delivery of the media description may comprise sending of the received media description to the client.

According to a further embodiment, the delivery of the media description may comprise a sending of information for enabling the client to obtain the media description from the media server. An example for such information for enabling the client to obtain the media description may be an identity of the media description, e.g. media description Uniform Resource Identifier (URI).

According to a further embodiment, the media description delivery rule may specify at least one pre-defined content requirement and wherein in the verification step content of the received media description is compared to the pre-defined content requirement. For illustration, the following example of a media description delivery rule may be provided: if the received media description is empty or only specifies a start time but does not comprise media links, then this media description shall not be delivered to the client.

According to a further embodiment, the media description delivery rule may concern a relation of at least two media descriptions and wherein in the verification step the received media description may be one of the at least two media descriptions. For example, there might be a master media description stored at the media description delivery managing device. The received media description may be compared to the stored master media description to verify if the received media description complies with the master media description or not. The media description delivery rule may specify to only deliver received media descriptions that comply with the master media description. Further examples are described in the following two embodiments.

According to a further embodiment, a further media description may be received and the further media description may be a second one of the at least two media descriptions.

According to a further embodiment, the further media description may be received earlier in time compared to the media description, and the media description delivery rule may specify that the media description is to be sent only if the media description is an update of the further media description.

According to a further embodiment, the further media description may be received in response to a sending of a further request for a media description delivery to the media server. For example, this may be for receiving one or more (further) media descriptions via a pull-based request-response mechanism; alternatively, one or more (further)

media descriptions may be received via a push-based mechanism, i.e. media descriptions are pushed from the media server to be received at the media description delivery managing device without the necessity to explicitly to request each and every (further) media description.

According to a further embodiment, at least one of the media description and the information enabling the client to obtain the media description that are sent to the client may be communicated according to a first transport protocol and wherein at least one of the request for a media description delivery that is sent to the media server and the media description that is received from the media server may be communicated according to a second transport protocol.

According to a further embodiment, at least one of the further request for a media description delivery and the further media description received from the media server may be communicated according to the second transport protocol.

According to a further embodiment, the subscription request may be communicated according to the first transport protocol.

According to a further embodiment, the first transport protocol may be a Session Initiation Protocol (SIP).

According to a further embodiment, the second transport protocol may be a Hyper Text Transfer Protocol (HTTP).

According to a second aspect, a method for providing a media description of a media stream to a client is provided wherein a subscription request for subscribing the client to a media description delivery service is sent to a media description delivery managing device and the media description is received from the media description delivery managing device.

According to a third aspect, a method for providing a media description of a media stream to a client is provided wherein a subscription request for subscribing the client to a media description delivery service is sent to a media description delivery managing device. Information enabling the client to obtain the media description from a media server is received from the media description delivery managing device. According to the received information, a request to obtain the media description is sent to the media server and the media description is received from the media server. For example, the received information may comprise an identifier of the media description that is to be obtained (e.g. MPD URI) and this identifier can be included into the request that is sent to the media server to obtain the media description. The media server thus can identify the media description and can send it to the client.

According to an embodiment, the subscription request may specify at least one of an address of the client, an indication for the media description delivery service, and which media description is to be delivered.

According to a further embodiment, the subscription request may be communicated according to a first transport protocol and at least one of the request to obtain the media description and the media description that is received from the media server may be communicated according to a second transport protocol.

According to a further embodiment, the first transport protocol may be a Session Initiation Protocol (SIP).

According to a further embodiment, the second transport protocol may be a Hyper Text Transfer Protocol (HTTP).

According to a fourth aspect, a media description delivery managing device is provided which is adapted to perform the steps of a method according to the first aspect and/or any of the respective embodiments thereof.

According to an embodiment, the media description delivery managing device may comprise at least one receiving unit, at least one transmission unit, and a processing unit. The media description delivery managing device typically comprises further a storage unit.

According to a fifth aspect, a client device is provided which is adapted to perform the steps of a method according to the second or third aspect and/or any of the respective embodiments thereof.

According to an embodiment, the client device may comprise at least one receiving unit, at least one transmission unit, and a processing unit. The client device typically further comprises a storage unit.

According to a sixth aspect, a system comprising a media description delivery managing device as described before, a client device as described before, and a media server is provided.

The present invention also concerns computer program(s) comprising portions of software codes in order to implement the method(s) as described above when operated at a media description delivery managing device and a client device. The computer program(s) can be stored on a computer readable medium. The computer-readable medium can be a permanent or rewritable memory within the respective device(s) or located externally. The computer program(s) can be also transferred to the respective device(s) for example via a cable or a wireless link as a sequence of signals.

According to a seventh aspect, a computer program loadable into a processing unit of a media description delivery managing device is provided. The computer program comprises code adapted to perform the steps of a method according to the first aspect and/or any of the respective embodiments thereof when processed by the processing unit.

According to an eighth aspect, a computer program loadable into a processing unit of a client device is provided. The computer program comprises code adapted to perform the steps of a method according to the second or third aspect and/or any of the respective embodiments thereof when processed by the processing unit.

The foregoing and other objects, features and advantages of the present invention will become more apparent in the following detailed description of embodiments as illustrated in the accompanying drawings.

DETAILED DESCRIPTION

In the following, methods and devices for providing a media description of a media stream to a client are described in more detail.

Figure 3:
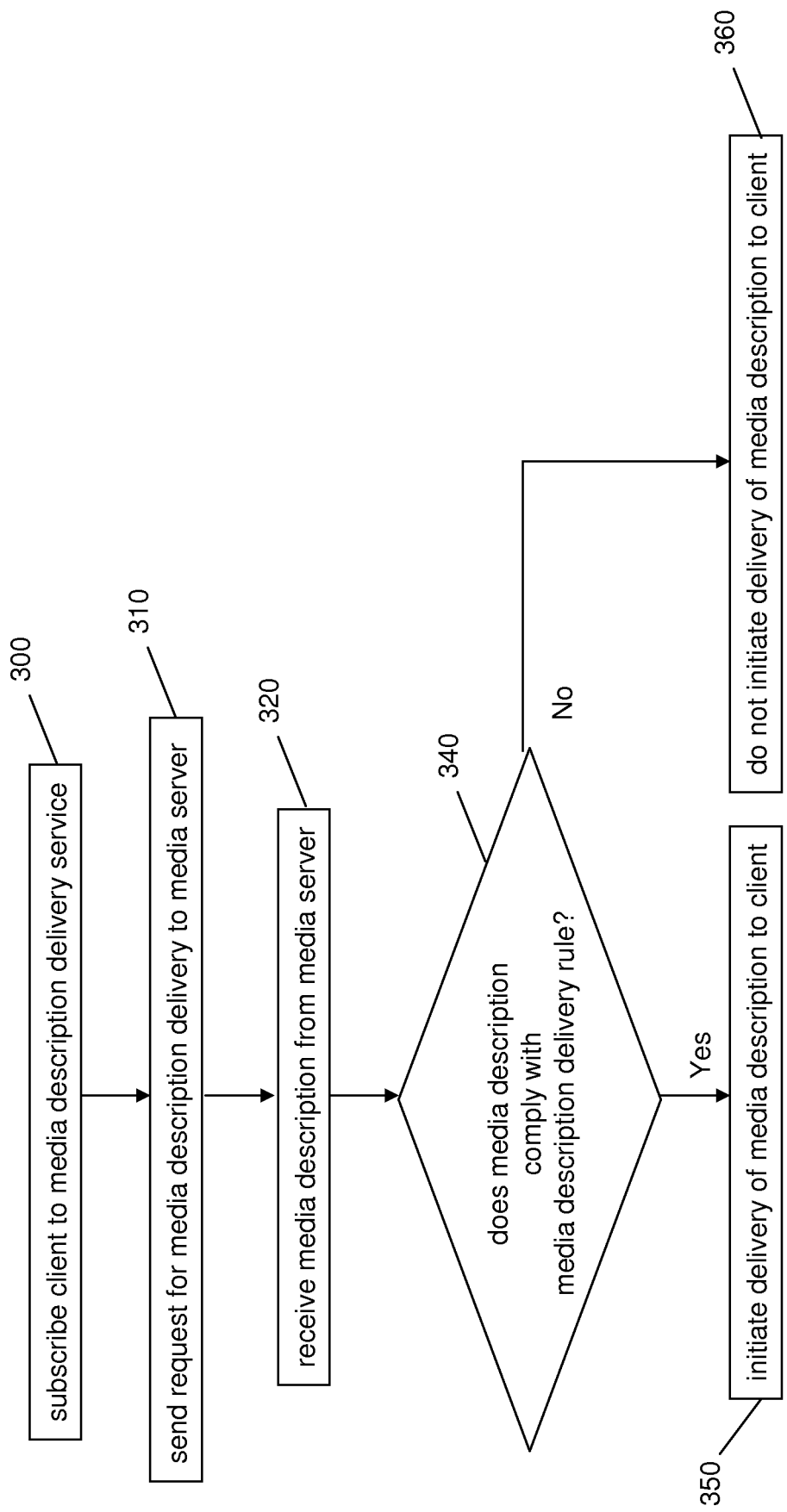
FIG. 3 shows a flow diagram illustrating a method for providing a media description of a media stream to a client performed at a media description delivery managing device.

As can be seen in FIG. 3, a client is subscribed 300 to a media description delivery service which comprises a media description delivery rule. A request for a media description delivery is sent 310 to a media server and from the media server a media description is received 320. It is verified 340 that the received media description complies with the media description delivery rule. If the verification is in the affirmative ("Yes"), a delivery of the media description to the client is initiated 350. If the verification is not in the affirmative ("No"), the delivery of the media description may not be initiated 360.

Figure 4:
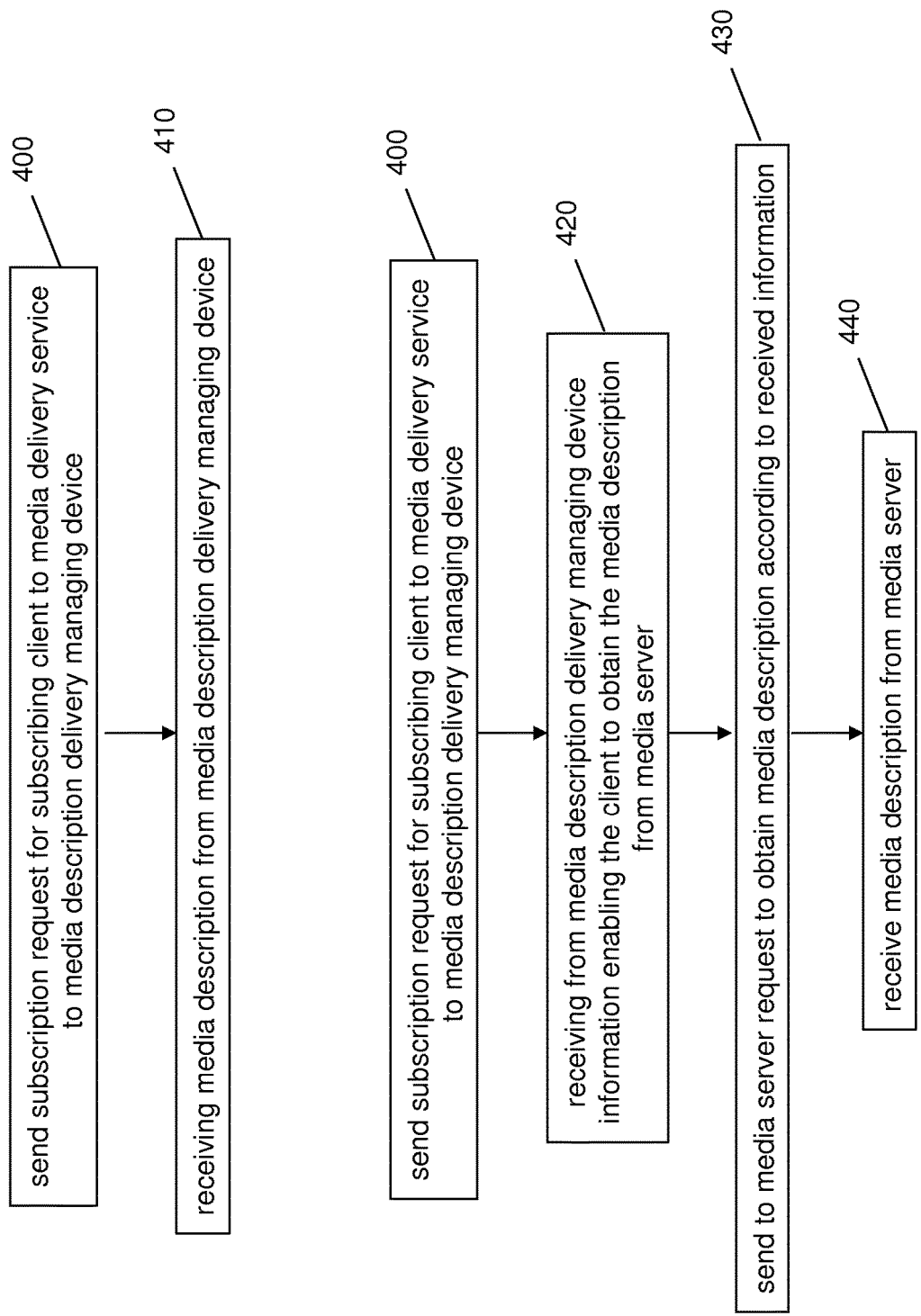
FIG. 4 shows a flow diagram illustrating two methods for providing a media description of a media stream to a client performed at a client device.

As can be seen in the upper part of FIG. 4, a subscription request for subscribing a client to a media description delivery service is sent 400 to a media description delivery managing device. From the media description delivery managing device the media description can be received 410. Alternatively to step 410 and as depicted in FIG. 4 lower part, information enabling the client to obtain the media description from a media server may be received 420 from the media description delivery managing device, a request to obtain the media description according to the received information may be sent 430 to the media server, and the media description can be received 440 from the media server.

A media description may be defined as in the background section (also denoted as media presentation description or MPD), e.g., it may describe the media stream (a media stream may comprise a plurality of consecutive stream elements in terms of different available media stream qualities and possibilities to obtain the media stream according to at least one of the available qualities. It may further comprise information to support the processing of the media stream at the client, e.g. selection of segments to be fetched and played-out at the client.

However, there might be embodiments of media descriptions that appear to be incomplete, e.g. that do not comprise media links required to request the media segments from the media server. For example, such a media description may be empty or just define a start time but lack one or more of the media links.

A media description delivery rule of a media description delivery service to which the client is subscribed to may be configured to filter out such incomplete media descriptions. For example, data files may be received as media description from the media server, but may be verified to not comply with the media description delivery rule e.g. specifying that only those media files that comply with certain content requirements shall be delivered to the client. An example for such a content requirement may be a specification that at least one media link must be present. Those filtered out media descriptions are not sent to the client, thus saving messages. Furthermore, in the verification it may be analyzed whether the received media description is an update compared to a previously received media description and to suppress any sending of a not updated media description thus saving further messages on the communication path to the client.

Typically, the subscription to the media description delivery service is made by a subscription request received from the client. The subscription request typically specifies an address of the client to which the media description is delivered to in the delivery. The subscription request may further comprise an indication for the media description delivery service with or without explicit specification of the media description delivery rule. For example, the rule may be implicitly set when subscribing to the service or may be entered or adjusted by the client to be implemented at the media description delivery managing device, i.e. the rule may be set by the client and/or a service provider of the media delivery service. The subscription request may further specify which media description or set of media descriptions are to be delivered. However, the media description delivery managing device may be adapted to determine a media description identifier to include into the request for the media description that is sent to the media server such that the media server can obtain the media description. Alternatively or in addition, the media description delivery managing device may send a client identifier to the media server which may administer media descriptions on a per client base, e.g. one media description per client and time unit. For the given client at the requested time, the corresponding media description is sent from the media server to the media description delivery managing device. For example a SIP Subscribe message may comprises a client address in the "from" header. It may further comprise a specification of the event such as MPD update as an example for a media description delivery service comprising a media description delivery rule that only MPD updates shall be delivered to the client device. Furthermore, in a user part of the SIP INVITE or in a separate SIP message an identifier for at least one MPD that is to be delivered may be included. This MPD identifier does not necessarily be the same one that is later used to request the MPD from the media server. Based on the received MPD identifier, the media description delivery managing device may identify the media server. Alternatively or in addition, there might be further media server identification mechanisms, e.g. on a per client base or there might be even only one media server per media description delivery managing device.

Alternatively or in addition to the communication and processing of identifiers, services, and rules as described before, those may be configured to be set and managed via O&M measures by an operator, e.g. a client may be subscribed in that way.

Figure 5:
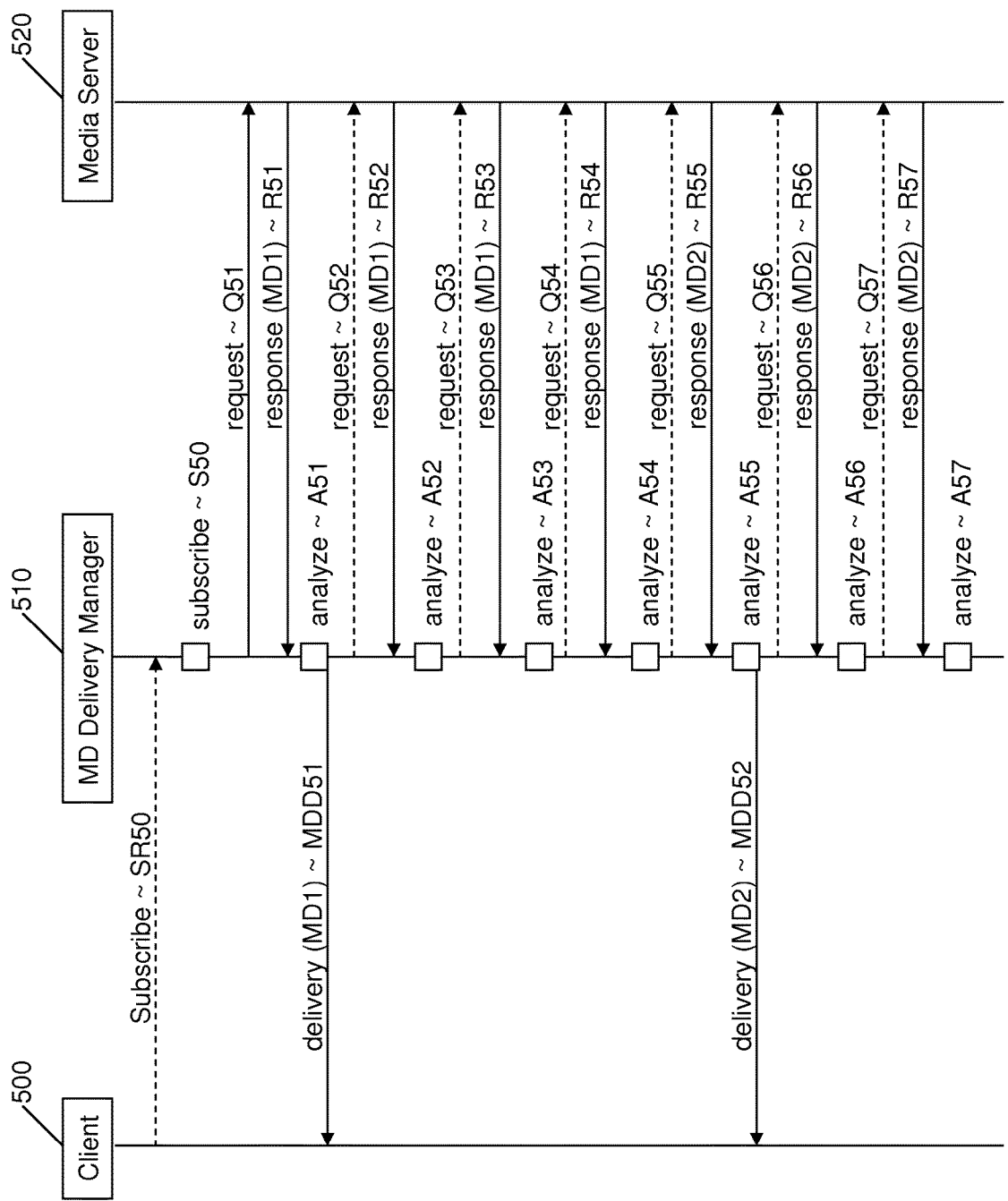
FIG. 5 shows a signaling diagram according to a first embodiment of the invention.

FIG. 5 shows a client 500, a media description (MD) delivery manager 510, and a media server 520 together with messages SR50, MDD51, MDD52, Q51-Q57, R51-R57 communicated between the respective devices and processes S50, A51-A57 performed at the respective devices. Optional messages SR50, Q52-Q57 are indicated by a dashed line. The client 500 is subscribed S50 to a media description delivery service at the MD delivery manager 510, e.g. triggered by a reception of subscription request SR50. A request Q51 for a media description is sent from the MD delivery manager 510 to the media server 520 and in response R51 a first media description MD1 is returned. The first media description MD1 is analyzed A51 by applying a media description delivery rule of the media description delivery service. The rule may specify that an initially received media description that complies with certain media description content requirements shall be sent to the client. In the analysis, the received media description MD1 is verified to comply to this rule. Consequently, the media description MD1 is delivered to the client 500, e.g. by sending a message MDD51 comprising the media description MD1 to the client. Subsequently, the MD delivery manager 510 may receive further messages R52-R54 comprising media description MD1 and further messages R55-R57 comprising media description MD2 which is an update of media description MD1. The further messages R52-R57 may be triggered by further requests Q52-Q57 as indicated or a push service may e.g. trigger the media server 520 to (regularly) send the messages R52-57 comprising the media descriptions as indicated. According to the present embodiment, the media description delivery rule of the media description delivery service to be applied at analysis processes A52-57 concerns a relation of two media descriptions with the rule specifying that each later received media description is analyzed A52-57 by comparing it to the corresponding previously received media description, e.g. MD1 received via message R52 with MD1 received via message R51 and so forth. If the later received media description is not verified as an update of the previously received media description, the later received media description will not be sent to the client 500 (which is an equivalent definition of specifying that in case of an update, the update will be sent, i.e. if the later received media description is verified as an update of the previously received media description, the later received media description is sent to the client 500). According to the present example, messages R52-R54 each comprise the first media description and no media description is sent to the client as a result of the analysis A52-A54. Message R55 comprises a second media description (MD2) which is an update of the first one (MD1). Applying the update media description delivery rule to the media description received via message R54 and via message R55, it is determined that the later received media description has changed, i.e. is an update of the first media description MD1. Consequently, the later received media description MD2 is delivered to the client 500, e.g. via message MDD52. The following messages R56 and R57 each comprise previously received media description MD2 which both are recognized in processes A56 and A57, respectively, to be not an update of MD2 which has been first received via R55. Hence, media description MD2 as received via messages R56 and R57 are not delivered to the client 500.

Figure 6:
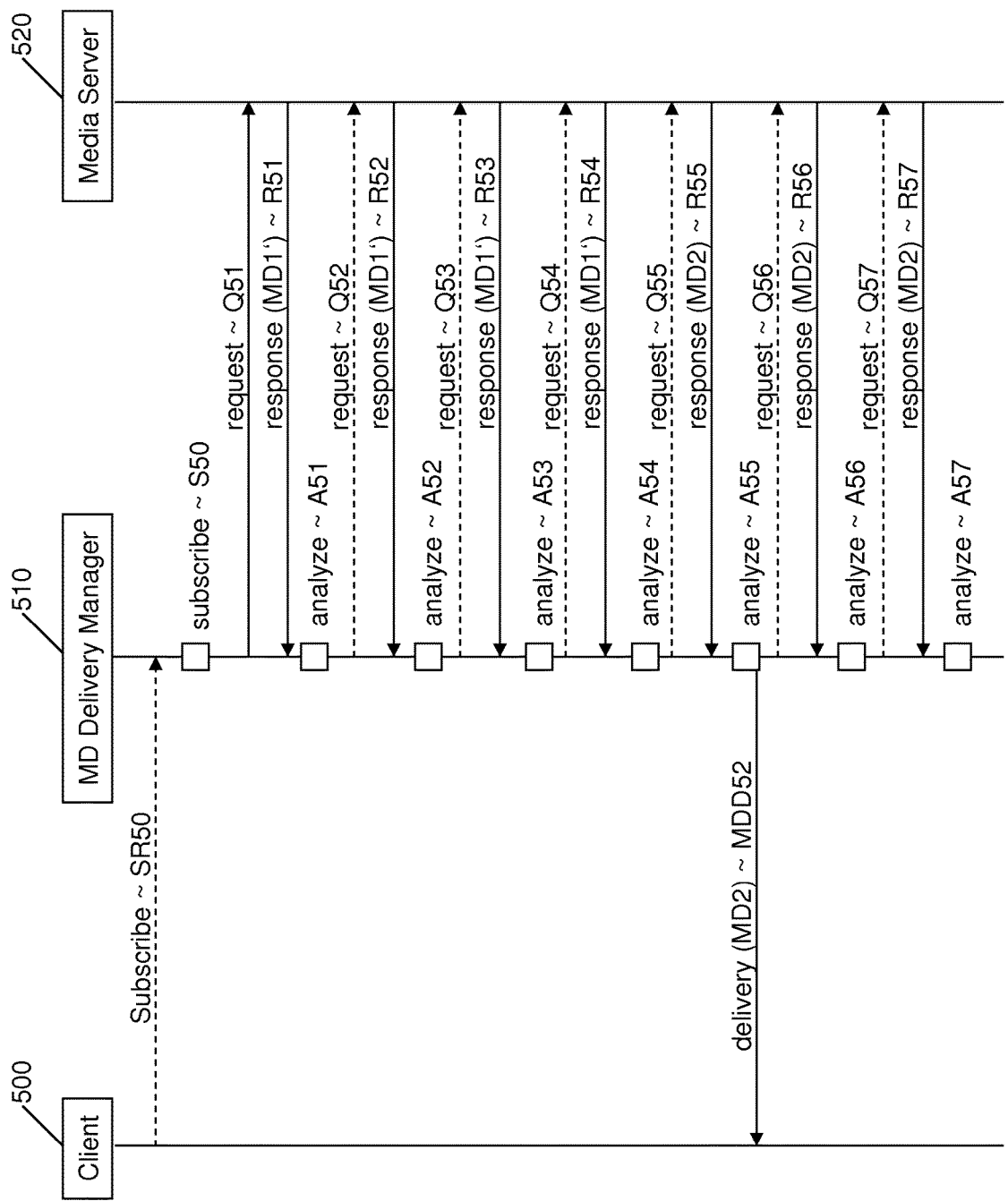
FIG. 6 shows a signaling diagram according to a second embodiment of the invention.

FIG. 6 shows a further signaling diagram according to a second embodiment of the invention. FIG. 6 differs from FIG. 5 in that the first media description MD1' that is received via message R51 is determined to not comply with pre-defined media description content requirements, e.g., the media description is empty or misses links or deviates in different way from the pre-defined content requirements. Consequently, the first media description MD' is not sent to the client 500 after the first analysis A51. All media descriptions received subsequent to message R51 via messages R52-R54 neither comply with the pre-defined content requirements nor constitute an update, i.e. the delivery of media description MD1' can be suppressed by media description delivery rule based on pre-defined content requirements and/or by media description delivery rule based on update verification based on comparison of later to earlier received media description. The media description MD2 received via message R55 complies with both rules and is consequently delivered to the client 500.

The present invention may be further embodied in procedures for MPD delivery in an IMS controlled infrastructure, in particular for providing MPD updates to a client. (Frequent) regular polling requests for MPD updates may be executed by the HTTP/SIP adapter towards the HTTP server. In that way the HTTP/SIP adapter is always up-to-date with the current MPD. The UE can then subscribe towards the HTTP/SIP adapter at the beginning of a session on "MPD Update" events. The HTTP/SIP Adapter can then notify the UE as soon as the MPD is updated. The notification message may include either the updated MPD or the MPD URI in order to fetch the updated MPD.

Elements that are involved in the message flow in an IMS controlled infrastructure are the User Equipment (UE), e.g., mobile phone as an example for a client, the IP Multimedia Core Network Subsystem (IM CN Subsystem), the Session Control Function (SCF), the HTTP/SIP adapter as an example for a device hosting a media delivery server with protocol conversion functionality (or in other terms as an example for a media description delivery managing device with protocol conversion functionality), and the HTTP server as an example for a media server. IM CN Subsystem and SCF may be standard IMS components and are typically not affected when implementing the invention.

To benefit from the features described in this invention, the UE preferably has to implement the features as described herein. Furthermore, the HTTP/SIP adapter and the (at least one) HTTP server may typically be extended when implementing the method described herein. More than a single HTTP server may be used, e.g., when the MPD and the different media qualities are distributed via different servers. Furthermore, a complete Content Distribution Network (CDN) may be used instead of simple HTTP servers. However, all these distributed embodiments may be comprised by the term "media server" which may be a stand-alone device or an ensemble of connectable devices, e.g. a system. Accordingly, the HTTP/SIP adapter and the HTTP server may be implemented as components on the same hardware or even within a single software. In this case, the interface between the two components may be different, i.e., not based on HTTP (in that case, a denotation of SIP/HTTP adapter may be misleading as there might be no HTTP interface between this SIP/"HTTP" adapter and the HTTP server). An example for a non-HTTP interface between those two devices may, e.g., be based on Application Programming Interface (API) calls.

Figure 1:
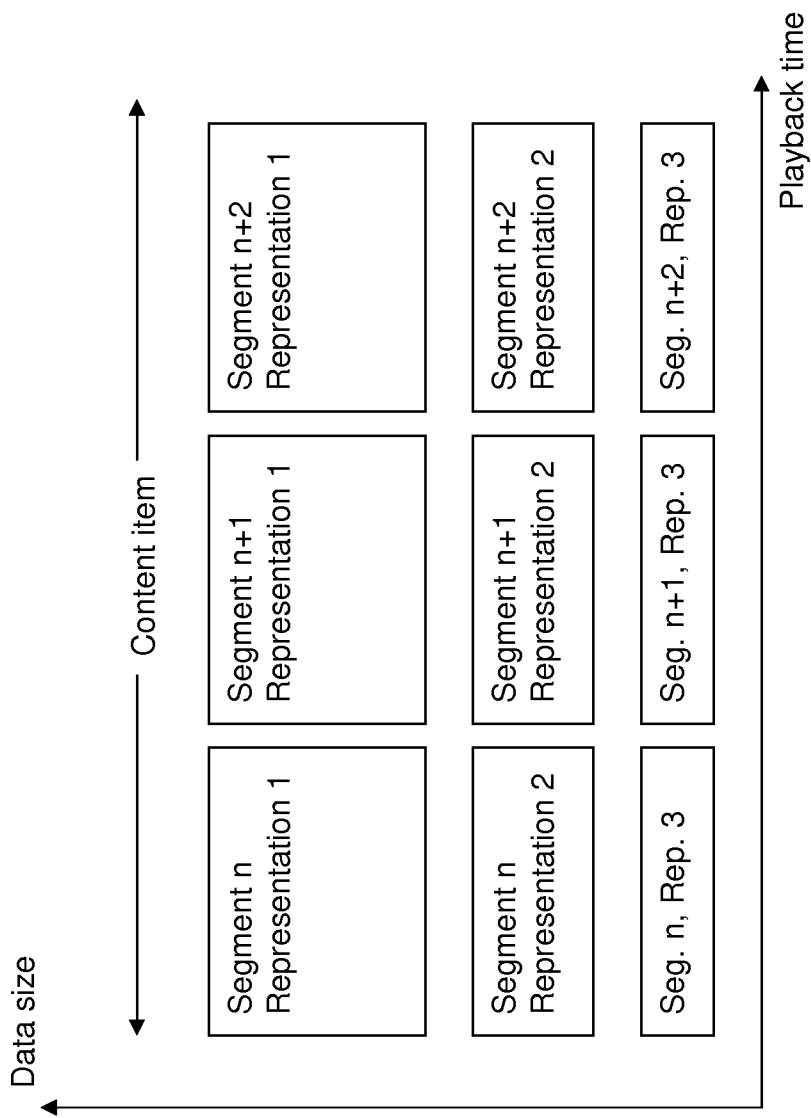
FIG. 1 illustrates media representations of a media stream.
Figure 2:
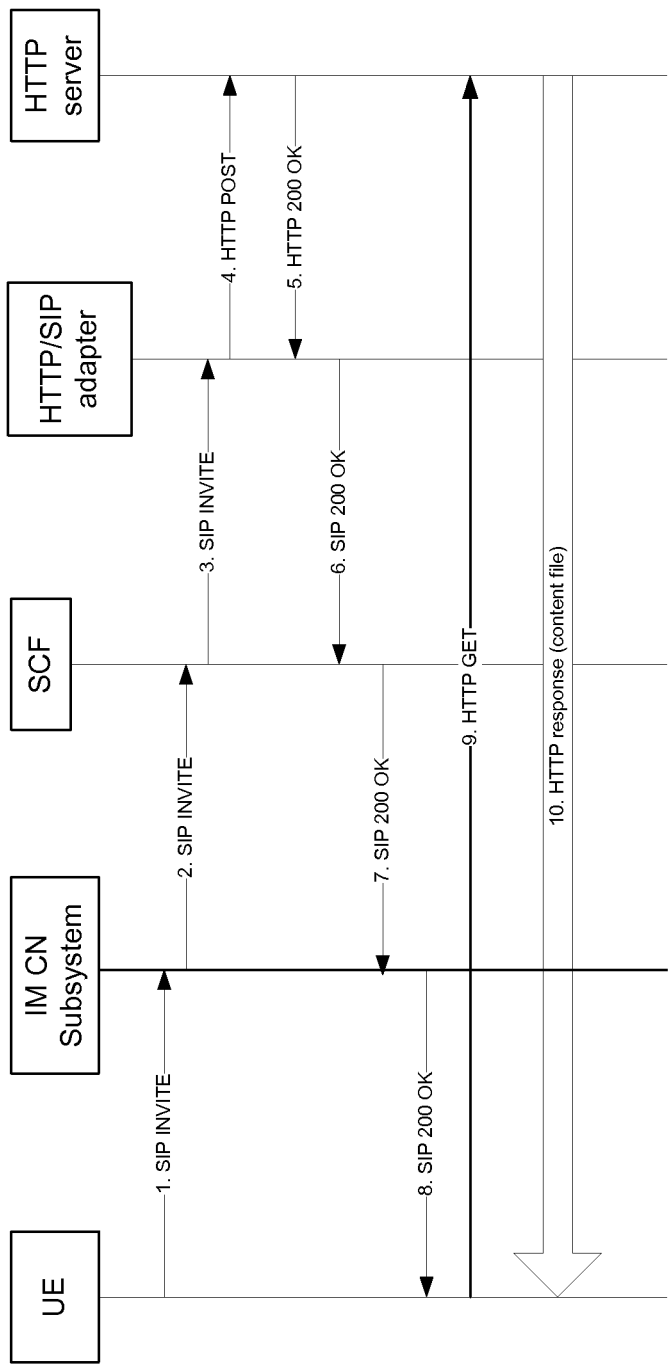
FIG. 2 shows a signaling diagram of an IMS controlled HTTP download.

IMS controlled HTTP progressive download as described in the background section and as depicted in FIG. 2 provide a possibility to transport an MPD to the UE. The UE may request delivery of an MPD by sending SIP INVITE (messages 1-3 in FIG. 2) to the HTTP/SIP server which in turn requests the MPD (via message 4) from the HTTP server. The HTTP server responds HTTP POST (message 5) comprising the requested MPD which is subsequently forwarded via SIP 200 OK (messages 6-8) to the UE. As an alternative MPD delivery, not the MPD but an MPD URI may be sent from the HTTP Server via messages 5-8 to the UE which subsequently can request the delivery of the MPD by sending a HTTP GET (message 9) comprising the MPD URI to the HTTP Server. The HTTP Server may respond by an HTTP Response comprising the desired MPD. Having received the MPD, the UE can start a DASH session at the HTTP server and process the received segments accordingly.

In the progress of the DASH session, the MPD may be updated at the HTTP server. In order to get informed on an MPD update, the UE cannot repeatedly apply the method described in the paragraph above as each new SIP INVITE will always cause a new session to be initiated. However, requesting the MPD update via HTTP-request-response with the HTTP server as already explained above is problematic as described before.

Accordingly, the inventors figured out that especially for MPD updates the IMS controlled HTTP progressive download as known is not yet applicable without significant modifications in accordance with the invention as demonstrated in the following embodiment.

Figure 7:
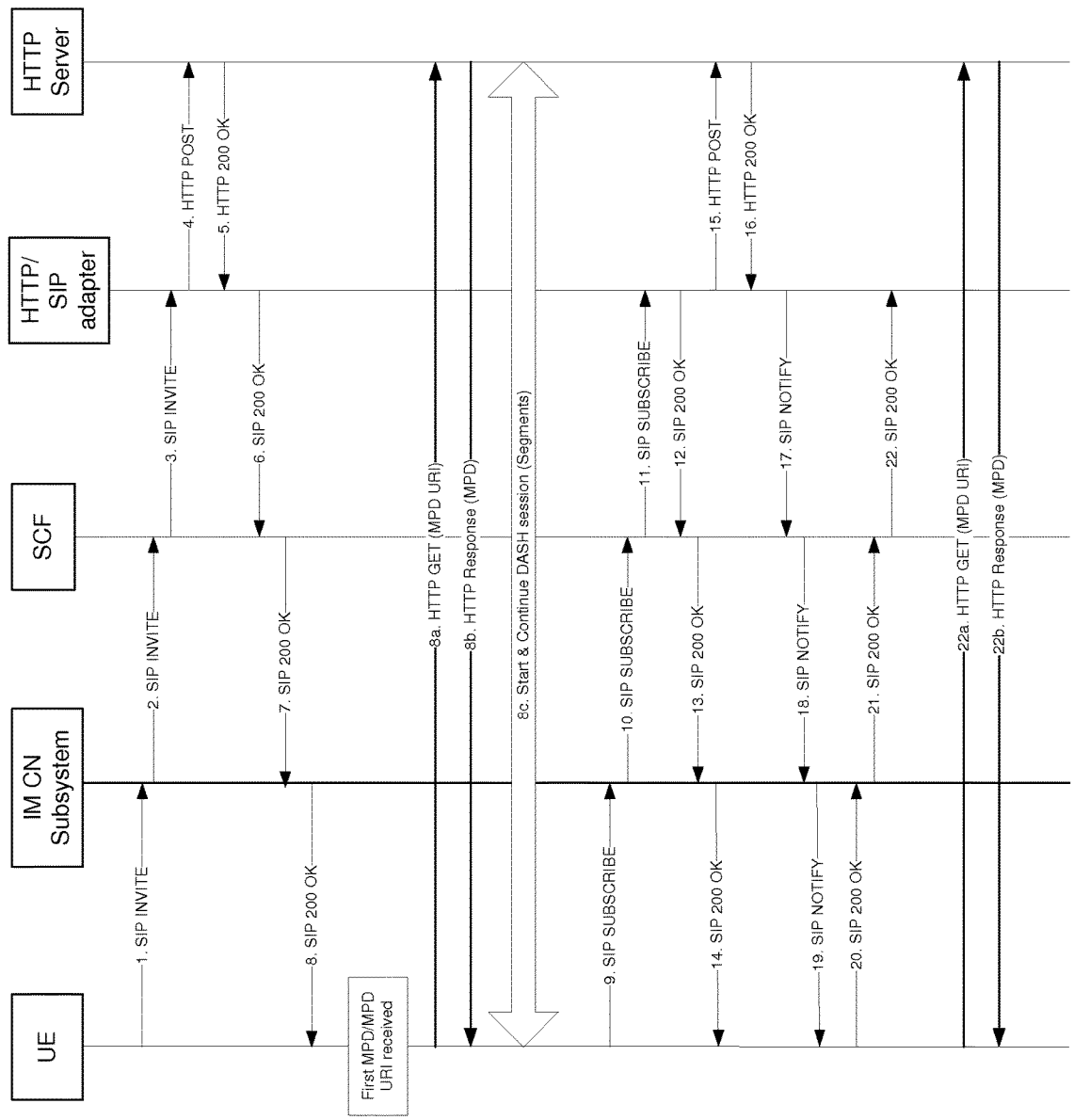
FIG. 7 shows a signaling diagram according to a third embodiment of the invention.

Referring now to FIG. 7 illustrating an example for a signal flow to provide one or more MPDs to a UE for IMS controlled DASH:

For session startup the UE sends a SIP INVITE (steps 1-3) to the SIP/HTTP adapter.

If the SIP/HTTP adapter and the HTTP server are two separate entities, the SIP/HTTP adapter issues a HTTP request, e.g., a POST or GET request, to the HTTP server to obtain the URL to the original MPD and/or the original MPD itself (steps 4 & 5). As part of the HTTP response (step 5) the HTTP server sends to the SIP/HTTP adapter information about the suited polling interval (e.g. polling every 10 seconds).

A SIP 200 OK is sent to the UE (steps 6-8) which includes the MPD URL or the MPD itself.

In case of a received MPD, DASH may be started directly by fetching media segments from a HTTP server (step 8c). In case of a received MPD URL, the MPD is fetched via HTTP request/response (steps 8a & 8b) before the DASH session is started (step 8c).

After receiving the SIP 200 OK message in step 8, the UE issues a SIP SUBSCRIBE towards the SIP/HTTP adapter (steps 9-11). With this message, the UE subscribes to the event "MPD Update", i.e. to a media description delivery service comprising a media description delivery rule specifying that only updated MPDs are to be provided to the UE.

Steps 12-14 include the SIP 200 OK message from the SIP/HTTP adapter to the UE acknowledging the subscription.

Now, the SIP/HTTP adapter is polling, e.g. every 10 seconds, towards the HTTP server for an update of the MPD (step 15) by issuing a HTTP request, e.g., a POST or GET request. The HTTP server answers with HTTP 200 OK including the requested MPD (step 16). If the MPD is unchanged, steps 15 & 16 are executed several times in a row. The temporal distance between the HTTP requests is determined by the before-hand negotiated polling interval between SIP/HTTP adapter and HTTP adapter, e.g. every 10 seconds.

If the SIP/HTTP adapter recognizes that the MPD has changed, a SIP NOTIFY message is sent to the UE (steps 17-19). The SIP NOTIFY includes either the updated MPD itself or the URL of the updated MPD. After reception the UE issues a SIP 200 OK to the SIP/HTTP adapter (steps 20-22).

In case of a received URL of the updated MPD, the UE fetches the updated MPD via HTTP (steps 22a & 22b).

The DASH session is continued by fetching media segments as described in the updated MPD (not depicted).

Figure 8:
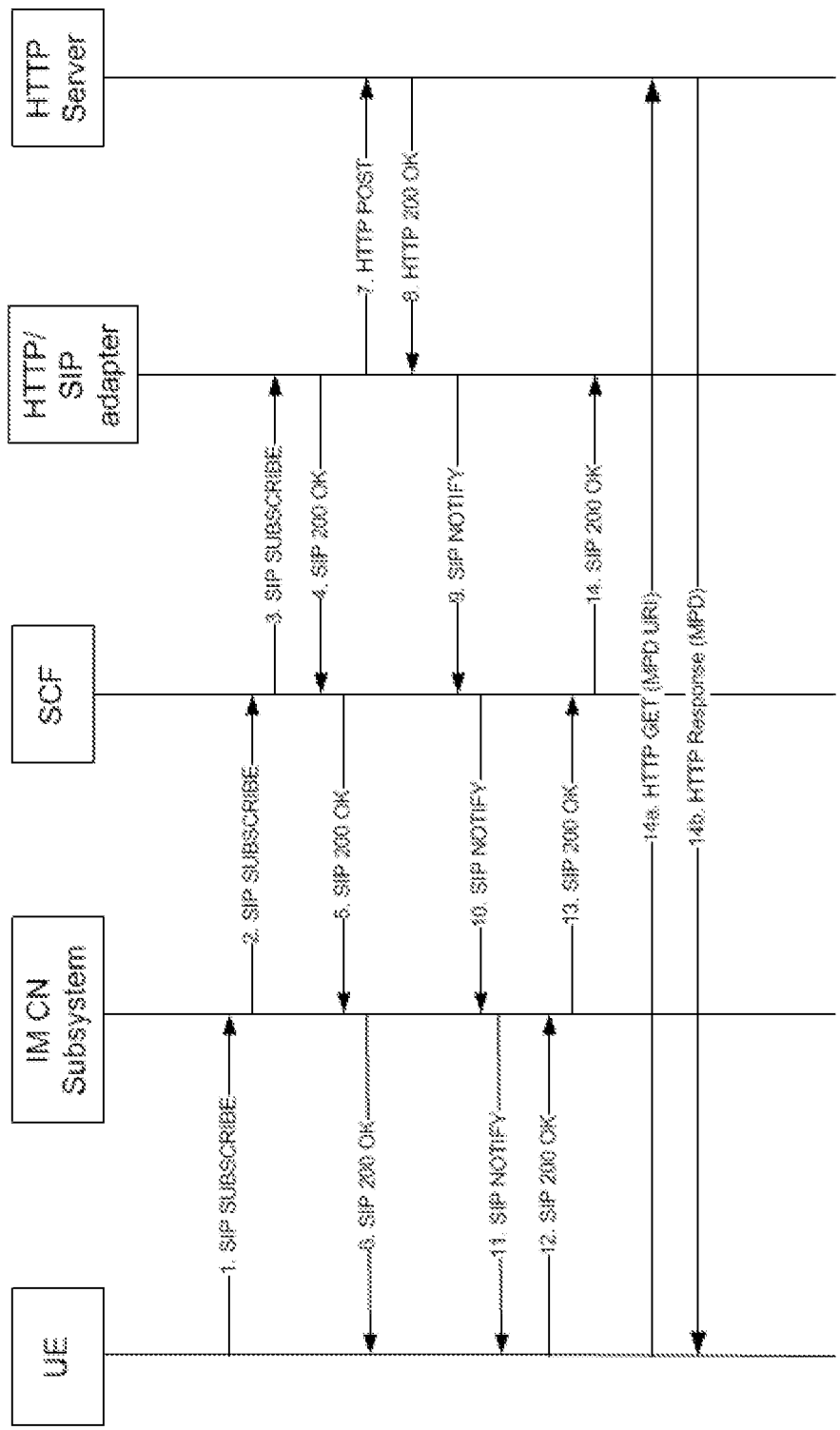
FIG. 8 shows a signaling diagram according to a fourth embodiment of the invention.

In FIG. 7, the SIP Subscribe message (9-11) can also be sent to the SIP/HTTP adapter (long) before the start of the DASH session. This will enable clients to subscribe for a kind of content publishing event. At the beginning, the MPD might be empty or indicate a start time in the future, but as soon it contains media links, the UE will get a SIP NOTIFY message (including the MPD or the URL of the MPD). After receiving the SIP NOTIFY in this case, the UE can start the process as described above and leave step 9, since it was already executed before. An example is depicted in FIG. 8, i.e. after message 11 has been received, a SIP invite message (not depicted in FIG. 8) may be sent to the HTTP/SIP adapter for starting the DASH session for receiving consecutive media elements to which the MPD which is to be received via messages 14a and 14b applies to. Message 14a and the SIP Invite message may be sent at the same time or otherwise timely correlated to provide that MPD and the media stream are received at the same time to align and thus optimize the media stream processing based on MPD at the UE.

According to a further embodiment, the HTTP/SIP adapter may make use of other or additional mechanisms in the steps 4 & 5 or 15 & 16 of FIG. 7 or 7 and 8 of FIG. 8. Instead of regular polling of updates for the MPD changes, the HTTP/SIP adapter may make use of potentially offered push mechanisms by a HTTP server. This push service could also be offered by another node or service that can act a as a push aggregator. This would not only reduce the load on the link between the SIP/HTTP adapter and the UE, but also between the SIP/HTTP adapter and the HTTP server. Using push on this link is especially beneficial if the frequency for MPD updates is not known.

Figure 9:
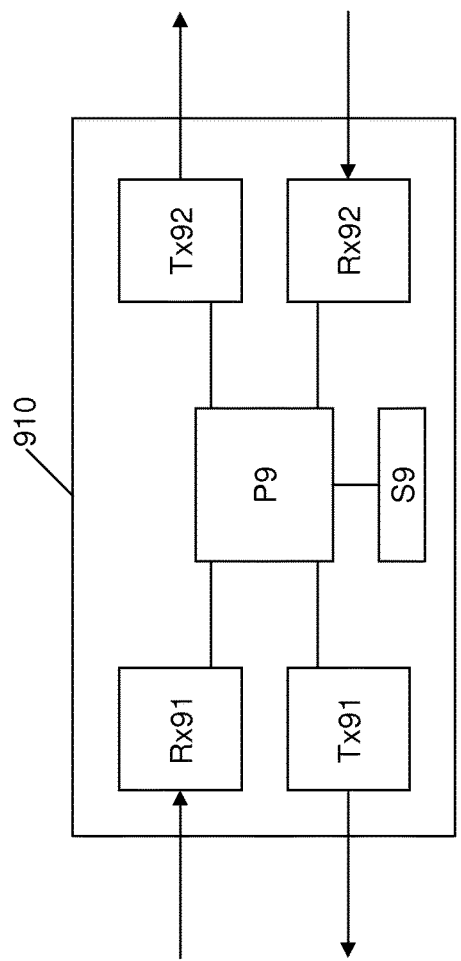
FIG. 9 shows an illustration of an embodiment of a media description delivery managing device.
Figure 10:
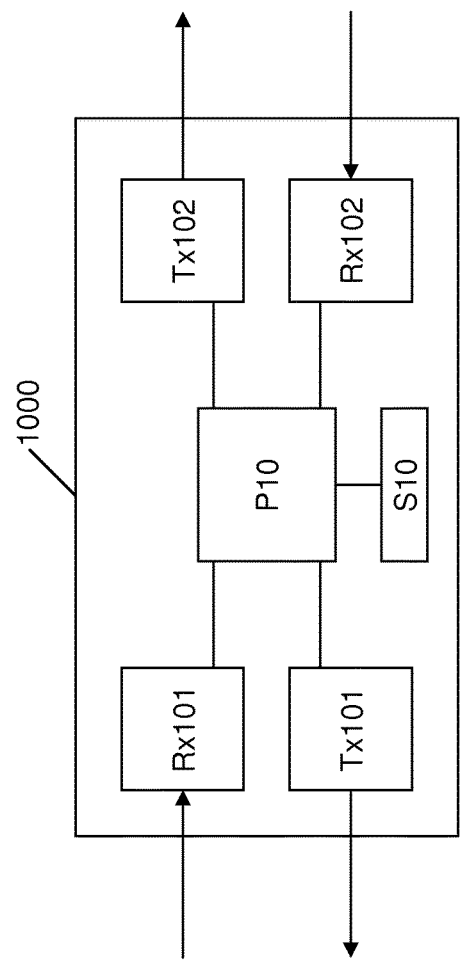
FIG. 10 shows an illustration of an embodiment of a client device.
Figure 11:
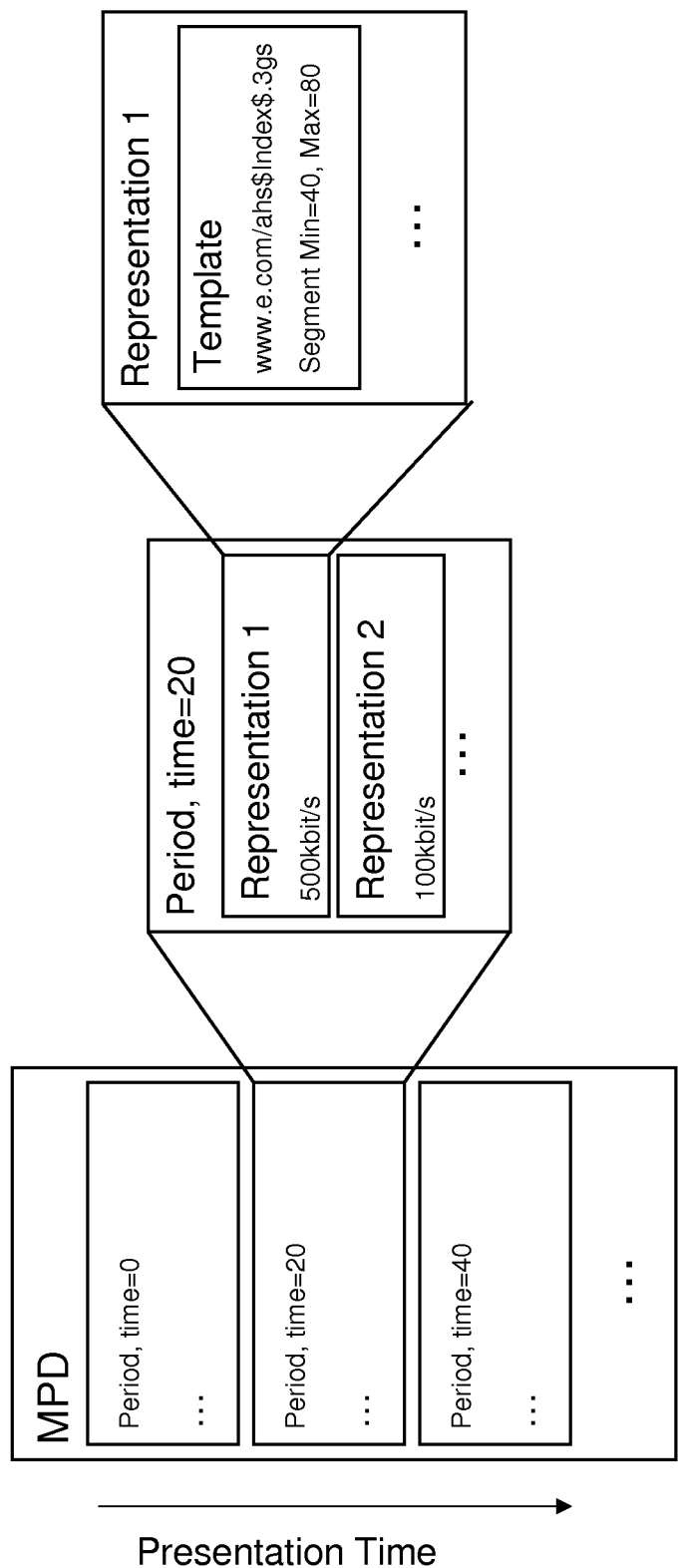
FIG. 11 shows an embodiment of a media description.

Referring now to FIGS. 9 and 10 showing illustrations of embodiments of a media description delivery managing device 910 and of a client device 1000, respectively.

Typically, the media description delivery managing device 910 communicates with the client via receiving unit Rx91 and transmission unit Tx91 and with the media server via receiving unit Rx92 and transmission unit Tx92, especially if communication with the client is performed according to a first transport protocol (e.g. SIP) and the communication with the media server is performed according to a second transport protocol (e.g. HTTP) different from the first protocol. However, there might be implementations where the communication with the client and the media server are performed via the same protocol while still using separate receiving units and transmission units. Alternatively, there might be implementations where a single receiving unit or a single transmission unit may be capable to communicate with both the media server as well as the client device 1000, e.g. for transmission or receiving unit that are capable to communicate according to different transport protocols. Here, only one set of receiving unit and transmission unit, e.g. receiving unit Rx91 and transmission unit Tx91, may be employed for the communication with the client as well with the media server and the other set of receiving unit and transmission unit, which would be following the example then receiving unit Rx92 and transmission unit Tx92, would not be needed. Although depicted as separate units, a transmission unit and receiving unit may be embodied in a transceiving unit.

According to an embodiment of the media description delivery managing device 910, the processing unit P9 may be adapted to subscribe the client to a media description delivery service, the media description delivery service comprising a media description delivery rule. The transmission unit Tx92 may be adapted to send a request for a media description delivery to a media server. The receiving unit Rx92 may be adapted to receive from the media server a media description. The processing unit P9 may be adapted to verify that the received media description complies with the media description delivery rule. If the processing unit P9 determines the verification to be in the affirmative, the processing unit P9 initiates a delivery of the media description to the client, e.g. by sending the media description or information enabling the client to obtain the media description from the media server via transmission unit Tx91 or transmission unit Tx92 to the client. Further steps of the method may be performed by the concerned units, e.g. a subscription request may be received via receiving unit Rx91 or a received (further) media description may be stored in storage unit S9 etc.

A further media description that is received at an earlier time may be stored at a storage unit of the media description delivery managing device 910. When the media description is received at a later time, the further media description can be retrieved from the storage unit and both media descriptions are input into a processing unit of the media description delivery managing device 910 for a corresponding verification according to the media description delivery rule, i.e. to verify if the later received media description is an update of the earlier received further media description and if the later received media description is determined as an update, to initiate the delivery to the client.

Typically, the client device 1000 communicates with the media description delivery managing device 910 via receiving unit Rx101 and transmission unit Tx101, e.g. to subscribe and to receive the media description from the media description delivery managing device 910. Communication with the media server may be performed via the same receiving unit Rx101 and transmission unit Tx101 and/or via receiving unit Rx102 and transmission unit Tx102, the latter option being especially applicable if communication with the media description delivery managing device 910 is performed according to a first transport protocol and communication with the media server is performed according to a second transport protocol.

However, there might be implementations where the communication with the media description delivery managing device 910 and the media server are performed via the same protocol while still using separate receiving units and transmission units. Alternatively, there might be implementations where a single receiving unit or a single transmission unit may be capable to communicate with both the media server as well as the media description delivery managing device 910, e.g. for transmission or receiving units that are capable to communicate according to different transport protocols. Here, only one set of receiving unit and transmission unit, e.g. receiving unit Rx101 and transmission unit Tx101, may be employed for the communication with the media description delivery managing device 910 as well with the media server and the other set of receiving unit and transmission unit, which would be following the example then receiving unit Rx102 and transmission unit Tx102, would not be needed. Although depicted as separate units, a transmission unit and receiving unit may be embodied in a transceiving unit.

According to an embodiment of the client device 1000, the transmission unit transmission unit Tx101 may be adapted to send a subscription request for subscribing the client to the media delivery service to a media description delivery managing device 910. The receiving unit Rx101 may be adapted to receive from the media description delivery managing device 910 the media description. Alternatively to the previously described reception, the receiving unit Rx101 may be adapted to receive from the media description delivery managing device 910 information enabling the client to obtain the media description from a media server. The transmission unit (Tx101 or) Tx102 may be adapted to send to the media server a request to obtain the media description according to the received information and the receiving unit (Rx101 or) Rx102 may be adapted to receive the media description from the media server.

Further steps of the method may be performed by the concerned units, e.g. a received media description may be stored in storage unit S10. When different transport protocols are used to communicate with the media server and the media description delivery managing device 910, the received information for enabling the client to obtain the media description may be converted by the processing unit P10 from one format according to the first transport protocol into another format according to the second protocol. Further protocol conversion processes may be performed by the processing unit P10.

The invention provides for a significantly reduced signaling overhead, in particular between client and the media server. It further provides for a prompt notification of clients in case of media description updates and a quicker reaction by the client to request the updated media stream, e.g. in terms of updated content and/or updated quality regarding the media server and/or further components of the telecommunication system, e.g. to reserve a higher transmission bitrate bearer at an IM CN Subsystem if the updated MPD indicates a media representation at higher quality.

The invention claimed is:

1. A method implemented by a media presentation description delivery managing device for providing a media presentation description of an adaptive bitrate media stream to a client device over a communication network to support adaptive bitrate streaming, the method comprising:
   subscribing the client device to a media presentation description delivery service, the media presentation description delivery service comprising a media presentation description delivery rule;
   sending, by the media presentation description delivery managing device, a request for a media presentation description delivery to a media server;
   receiving, by the media presentation description delivery managing device, a media presentation description from the media server, said media presentation description comprising information describing media segments of an adaptive bitrate media stream;
   verifying, by the media presentation description delivery managing device, that the received media presentation description complies with the media presentation description delivery rule; and
   if the verification is in the affirmative, initiating, by the media presentation description delivery managing device, a delivery of the media presentation description to the client device over the communication network.

2. The method of claim 1, further comprising receiving, by the media presentation description delivery managing device, a subscription request for the subscribing the client device to the media presentation description delivery service.

3. The method of claim 2, wherein the subscription request specifies at least one of an address of the client device, an indication for the media presentation description delivery service, and which media presentation description is to be delivered.

4. The method of claim 1, wherein the delivery of the media presentation description comprises sending the received media presentation description from the media presentation description delivery managing device to the client device.

5. The method of claim 1, wherein the delivery of the media presentation description comprises sending information from the media presentation description delivery managing device to the client device for enabling the client device to obtain the media presentation description from the media server.

6. The method of claim 1, wherein the media presentation description delivery rule specifies at least one pre-defined content requirement and wherein in the verification step content of the received media presentation description is compared to the pre-defined content requirement.

7. The method of claim 1, wherein the media presentation description delivery rule concerns a relation of at least two media presentation descriptions and wherein in the verification step the received media presentation description is one of the at least two media presentation descriptions.

8. The method of claim 7, wherein a further media presentation description is received by the media presentation description delivery managing device and the further media presentation description is a second one of the at least two media presentation descriptions.

9. The method of claim 8, wherein the further media presentation description is received earlier in time compared to the media presentation description, and the media presentation description delivery rule specifies that the media presentation description is to be sent only if the media presentation description is an update of the further media presentation description.

10. The method of claim 8, wherein the further media presentation description is received in response to a sending of a further request for a media presentation description delivery by the media presentation description delivery managing device to the media server.

11. The method of claim 5, wherein at least one of the media presentation description and the information enabling the client device to obtain the media presentation description that are sent by the media presentation description delivery managing device to the client device are communicated according to a first transport protocol, and wherein at least one of the request for a media presentation description delivery that is sent to the media server and the media presentation description that is received from the media server are communicated according to a second transport protocol.

12. The method of claim 11, wherein at least one of a further request for a media presentation description delivery and a further media presentation description received from the media server are communicated according to the second transport protocol.

13. The method of claim 11, further comprising receiving, by the media presentation description delivery managing device, a subscription request for the subscribing client device to the media delivery service, the subscription request specifying at least one of an address of the client device, an indication for the media presentation description delivery service, and which media presentation description is to be delivered, and wherein the subscription request is communicated according to the first transport protocol.

14. The method of claim 11, wherein the first transport protocol is a Session Initiation Protocol (SIP).

15. The method of claim 11, wherein the second transport protocol is a Hyper Text Transfer Protocol (HTTP).

16. A method for providing a media presentation description of an adaptive bitrate media stream provided by a media server to a client device to support adaptive bitrate streaming, wherein the method comprises:
  sending a subscription request for subscribing the client device to a media presentation description delivery service from the client device to a media presentation description delivery managing device, wherein the media presentation description delivery managing device is separate from the media server; and
  receiving, by the client device, the media presentation description from the media presentation description delivery managing device, said media presentation description comprising information describing segments of the adaptive bitrate media stream.

17. The method of claim 16, wherein the subscription request specifies at least one of an address of the client device, an indication for the media presentation description delivery service, and which media presentation description is to be delivered.

18. A method for providing a media presentation description of an adaptive bitrate media stream provided by a media server to a client device, wherein the method comprises:
  sending a subscription request for subscribing the client device to a media presentation description delivery service from the client device to a media presentation description delivery managing device wherein the media presentation description delivery managing device is separate from the media server;
  receiving, by the client device from the media presentation description delivery managing device, information enabling the client to obtain the media presentation description from a media server, said media presentation description comprising information describing segments of the adaptive bitrate media stream;
  sending a request to obtain the media presentation description according to the received information from the client device to the media server; and
  receiving, by the client device, the media presentation description from the media server.

19. The method of claim 18, wherein the subscription request is communicated according to a first transport protocol and at least one of the request to obtain the media presentation description and the media presentation description that is received from the media server are communicated according to a second transport protocol.

20. The method of claim 19, wherein the first transport protocol is a Session Initiation Protocol (SIP).

21. The method of claim 20, wherein the second transport protocol is a Hyper Text Transfer Protocol (HTTP).

22. A media presentation description delivery managing device configured to support adaptive bitrate streaming of an adaptive bitrate media stream, said media presentation description delivery managing device comprising:
  at least one receiving circuit;
  at least one transmission circuit;
  a processing circuit operatively connected to the at least one receiving circuit and the at least one transmission circuit;
  wherein the processing circuit is adapted to:
    subscribe the client device to a media presentation description delivery service, the media presentation description delivery service comprising a media presentation description delivery rule;
    send, via the at least one transmission circuit, a request for a media presentation description delivery to a media server;
    receive, from the media server and via the at least one receiving circuit, a media presentation description, said media presentation description comprising information describing segments of the adaptive bitrate media stream;
    verify that the received media presentation description complies with the media presentation description delivery rule; and
    if the verification is in the affirmative, initiate a delivery of the media presentation description to the client device.

23. A client device configured to perform adaptive bitrate streaming of an adaptive bitrate media stream comprising:

at least one receiving circuit;
at least one transmission circuit;
a processing circuit operatively connected to the at least one receiving circuit and the at least one transmission circuit;
wherein the processing circuit is adapted to:
  send, via the transmission circuit, a subscription request for subscribing the client to a media presentation description delivery service provided by a media server to a media presentation description delivery managing device wherein the media presentation description delivery managing device is separate from the media server;
  receive, via the at least one receiving circuit, a media presentation description from the media presentation description delivery managing device, said media presentation description comprising information describing segments of the adaptive bitrate media stream.

* * * * *